Patented Nov. 4, 1930

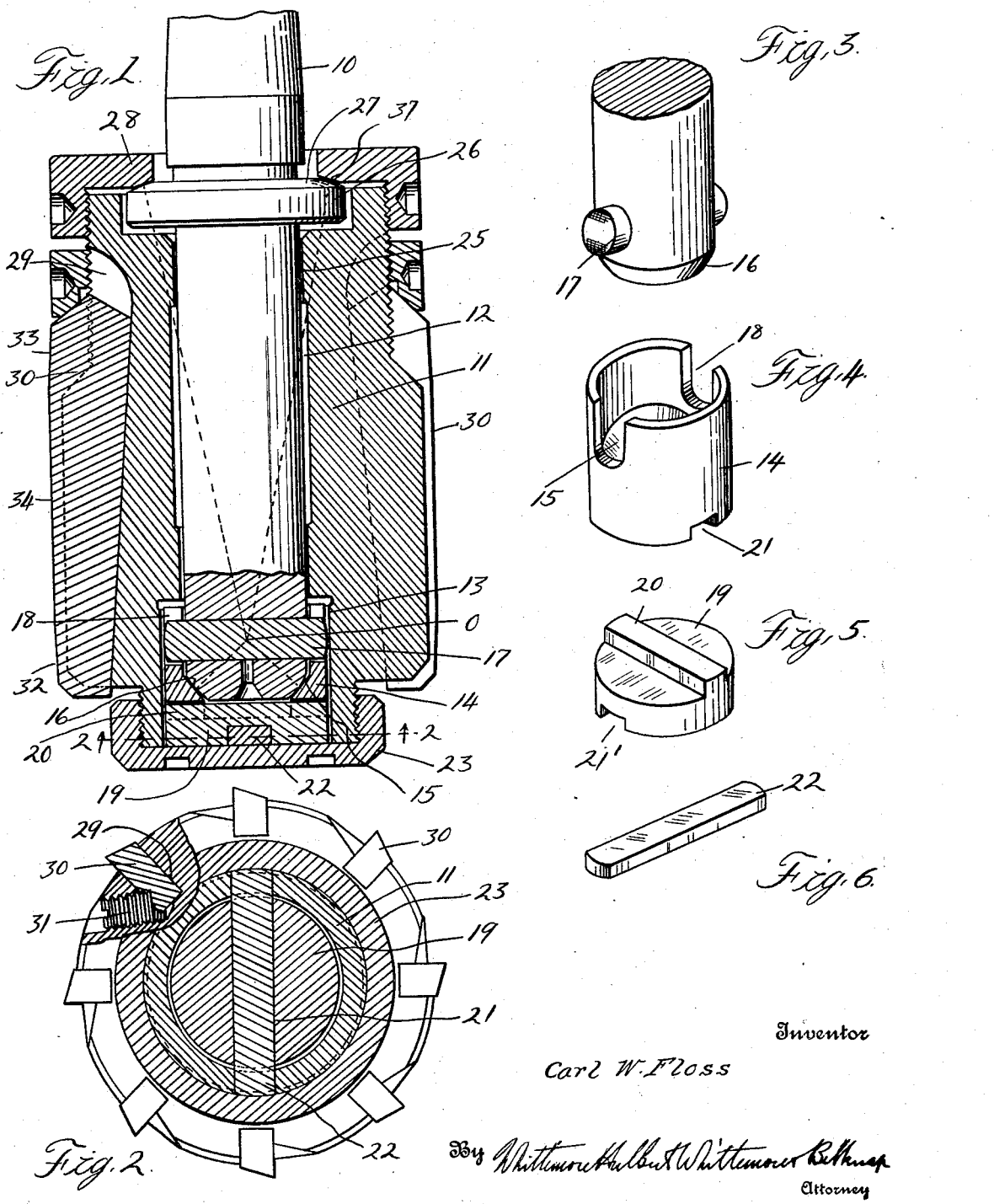

1,780,554

UNITED STATES PATENT OFFICE

CARL W. FLOSS, OF DETROIT, MICHIGAN

FLOATING REAMER

Application filed December 19, 1927. Serial No. 241,122.

The invention relates to reamers and similar tools and more particularly to the mechanism for mounting and driving the reamer shell.

The primary object of the invention is to provide an improved construction adapted to have a perfect floating action, as well as being designed to compensate for slight variations in axial center distances in multiple reaming operations.

According to my invention the reamer body or shell is driven from the driving shank through a universal connection at the forward end of the shell, which connection permits a swivelling of the reamer shell about a central point in such a manner as to insure the maintenance of a bore of constant diameter. The driving connection of the reamer is also provided with means for permitting slight lateral adjustment of the shell relative to the driving shank, this means acting to compensate for any variation between the center distances of the driving shanks and the distances between the axes of the work being operated upon. My invention consists further in providing a construction in which both the universal swivelling action of the shell and the lateral displacement of the shell relative to the shank are permitted while maintaining a positive and effective drive.

In the drawings which illustrate one embodiment of my invention.

Figure 1 is a longitudinal section through a reamer.

Figure 2 is a cross section on the line 2—2 of Figure 1.

Figure 3 is a perspective view of the lower end of the driving shank.

Figure 4 is a perspective view of the socket member cooperating with the driving shank.

Figures 5 and 6 are detailed views of the parts of the coupling for connecting the socket to the outer shell.

Referring now to the embodiment of my invention illustrated in the drawings, 10 is the driving shank of the reamer and 11 is the outer shell or blade-carrying portion which surrounds the shank 10. The shell 11 has a longitudinal bore 12 extending therethrough and of a diameter sufficient to provide clearance between the shell and the shank. The forward end of the shell has an enlarged bore 13 in which is retained the socket member 14. The socket member has a conical seat 15 adapted to engage the spherical end surface 16 on the driving shank 10, the center of curvature of this surface being the point O. For driving the socket 14 from the shank 10 the latter is provided with the transversely extending pins or lugs 17 which engage the slots or recesses 18 in the upper surface of the socket member.

In order to permit slight lateral movements of the outer shell relative to the socket member 14, a driving connection between the shell and the socket member is provided consisting of a disk member 19 having a raised tongue 20 thereon engaging a slot 21 in the socket member 14. The disk 19 also has a tongue and slot engagement with the outer shell arranged at right angles to the tongue and slot engagement with the socket member. As shown, the disk has the slotted recess 21′ extending at right angles to the tongue 20 for engaging a suitable key 22, the ends of which are connected to a threaded cap 23 for the outer shell. The socket member 14 is of slightly smaller diameter than the recess 13 in the outer shell, thus permitting lateral movement in all directions in a plane transverse to the axis of the shank.

As stated above, the shell 11 has a clearance with the shank 10 so as to permit the two parts to have a universal movement. The amount of this movement is limited by the size of the bearing surface 25 formed on the interior of the shell at the upper end thereof. The shank 10 is provided with an annular flange 26 adjacent the upper end of the outer shell and provided with a bearing surface 27 having a radius of curvature extending from the center O. The bearing surface is engaged by a cooperating conical surface 37 formed on a threaded cap 28, the latter engaging the upper end of the shell 11. The cap 28 may be adjusted on the shell to cause the surfaces 27 and 37 to have frictional contact so as to maintain the right degree of resistance to the swivelling action of the shell relative to the driving shank.

As stated above, the surfaces 16 and 27 of the driving shank are both spherical and have a common center. The respective cooperating surfaces 15 and 37 might also be curved about the same center if so desired, but preferably these surfaces are of conical form as illustrated in Figure 1. By reason of this construction the reamer shell has a universal rocking movement relative to the driving shank.

The outer shell of the reamer is preferably constructed in the usual manner, being provided with a series of longitudinally extending slots 29 arranged at intervals around the periphery of the shell. A reamer blade 30 is inserted in each slot, these blades being retained in position by any suitable means which as shown comprises a locking screw 31 threadedly engaging the shell at an angle to the plane of the reamer blade. The particular construction of the reamer blades and their assembly in the reamer shell will not be described in detail since they do not form part of the subject matter of this invention. However, it is preferable that the cutting edges of each blade be formed with a lead 32 and back-taper 33, between which is the full diameter portion 34. Since the reamer is entirely self-aligning the cutting portion 34 may be relatively long but preferably begins at a point to the rear of the center point O.

With the construction as described above, it will be observed that the reamer shell is free to float on the shank 10 by swivelling about the center point O and it is also free to move laterally relative to the axis of the shank by reason of the tongue and slot connection between the driving shank and the outer shell. It will also be observed that the drive for the reamer occurs at the forward end of the reamer shell so that as the reamer is advanced into the cylindrical work-piece the rear portions of the reamer blades are free to assume positions that will insure the formation of an accurate cylindrical bore.

Reamers constructed in accordance with my invention are particularly adapted for use in multiple reaming and an example of such operations is the reaming of the cylinders in an automobile engine. My construction insures obtaining cylinders of accurate diameter which are not out-of-round, and also provides for any slight variation in the center distances between adjacent cylinders which are necessarily found in commercial production of automobile engines.

While I have described one embodiment of my invention in considerable detail, it is to be understood that the invention in its broader aspect contemplates constructions varying somewhat from the specific details described, providing that they are capable of permitting both lateral and swivelling movements of the reamer shell relative to the driving member.

What I claim as my invention is:

1. A reamer comprising a driving shank, a blade-carrying shell surrounding said shank, a socket member drivingly connected to said outer shell and mounted to permit lateral movement of the same relative to said shell, said socket member and said shank being provided with cooperating surfaces adapted to form a universal connection and means for maintaining said surfaces in engagement while permitting swivelling of the opposite end of said shell relative to said shank.

2. A cutting tool comprising a hollow blade-carrying shell, a cap at the forward end of said shell, a socket member disposed within said hollow shell, driving connections between said socket member and said cap permitting lateral movement of said socket member relative to said shell, a spherical shoulder on said socket member, a spherical surface on said shank engaging the first mentioned spherical shoulder, a driving connection between said shank and said socket member and means for maintaining said spherical surfaces in engagement while permitting swivelling of said shell relative to said shank.

3. A cutting tool comprising a blade-carrying shell, a shank extending within said shell having a spherical end surface, a socket member surrounding the end of said shank and having a spherical surface engaging the same, a driving connection between said shank and socket member, a member drivingly connected to said socket member adapted to slide transversely relative thereto, a cap connected to said shell and having a driving connection with the last mentioned member capable of sliding at right angles to the first mentioned sliding movement, an annular flange on said driving shank and means on said shell engaging said flange and permitting rocking movements relative to said flange.

4. A cutting tool comprising a driving shank, a blade-supporting shell surrounding said shank and having limited clearance therewith, a socket member for the end of said shank drivingly connected thereto and having a clearance with said shell and driving elements between said socket member and said shell, two of said elements having sliding engagement with each other in directions at right angles to each other, a flange carried by said shank and means adjustably carried by the shell for engaging said flange, said means and said flange having engaging surfaces adapted to permit swivelling of said shell relative to said shank.

In testimony whereof I affix my signature.

CARL W. FLOSS.